United States Patent Office 3,398,143
Patented Aug. 20, 1968

3,398,143
PROCESS FOR THE PREPARATION OF 4,4'-BIS-(4-AMINO - 6 - ARYLAMINO - s - TRIAZIN - 2 - YLAMINO)-2,2'-STILBENEDISULFONIC ACID
Sigmund C. Catino, Castleton, and Albert F. Strobel, Delmar, N.Y., assignors to GAF Corporation, a corporation of Delaware
No Drawing. Filed Sept. 29, 1964, Ser. No. 400,237
7 Claims. (Cl. 260—240)

ABSTRACT OF THE DISCLOSURE

An improved method for preparing 4,4'-bis-(4-amino-6-arylamino-s-triazin-2-ylamino) - 2,2' - stilbenedisulfonic acid compounds, useful as optical brightening agents, requiring sequential reaction of 4,4'-bis-(4,6-dichloro-s-triazin-2-ylamino)-2,2'-stilbenedisulfonic acid first with ammonia and then with an arylamine.

---

This invention relates to an improved method for the preparation of 4,4'-bis(4-amino-6-arylamino-s-triazin-2-ylamino)stilbene-2,2'-disulfonic acid compounds, and more particularly such compounds which in the free acid form have the formula:

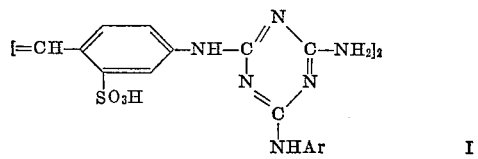

I wherein Ar represents a monocyclic, carbocyclic aromatic benzene ring which may be further substituted with such groups as halogen, alkyl, alkoxy, sulfonic acid, sulfonamide, substituted sulfonamide, carboxy, carboxamide, substituted carboxamide, cyano, alkyl sulfonyl (e.g., $-SO_2CH_3$), and the like. The free sulfonic acid group may be converted into a salt, particularly in utilizing same as hereinafter described, employing as the cation, an alkali metal, ammonium, or an amine.

Ditriazin derivatives of 4,4'-diaminostilbene-2,2'-disulfonic acid form a class of well known optical brightening agents, especially for cellulosic materials such as textiles, paper and the like. Such compounds are generally prepared by condensing the diamino disulfostilbene with cyanuric chloride. The resultant compound contains four reactive chlorine atoms, one on each of the remaining carbon atoms of the two triazin rings. The replacement of these chlorine atoms is readily accomplished since they are fairly reactive groups and in the preparation of most brighteners, especially those for cellulosic materials, the chlorine atoms are replaced with various amines or substituted amines. The compounds of the aforementioned types which contain two amino groups and two arylamino groups or substituted arylamino groups are particularly outstanding brightening agents for paper and other cellulosic materials, and have further extensive use in the beater dyeing of paper where size and alum are commonly employed. It has been found that such compounds in the beater dyeing of paper where a conventional size such as rosin or the like is used together with alum give an outstanding brightened paper product which overcomes many of the deficiencies which are characteristic of most of the other brighteners of this general class.

The general procedure for preparing the aminoarylamino derivative of the general type with which the present invention is concerned has been to treat the tetrochlorotriazin compound first with the arylamine in substantially stoichiometric amounts to convert two of the chlorine atoms to arylamino groups and follow this up with treatment with ammonia to convert the remaining two chlorine atoms to unsubstituted amino groups. The primary reason heretofore given for carrying out the condensation in this manner has been based essentially on an economic reason. Thus, since the first condensation is the smoothest and easiest, that is, the first two chlorine atoms react one on each of the triazin rings, it has been customary to make the first condensation with the arylamine which is the most expensive product and can be employed in this step of the reaction in equimolar amounts. Following this step with the ammonia, condensation can then be accomplished using a large excess of the less expensive ammonia and by the use of such an excess, the reaction equilibrium can be made to go more completely towards the formation of the ultimate condensation product. In attempting to prepare compounds of Formula I above by this technique, it has been found that the products which are produced are very inferior with regard to their brightening effect and are quite yellow in hue. In addition, it has been found that the yields are considerably wanting. It has been proposed to overcome such deficiencies in the process by carrying out the process as outlined above by employing first a vacuum removal of solvent in the first condensation followed by autoclaving with ammonia in the second step. While this technique produces a somewhat better product, the added costs of the additional handling and special equipment indicate the economic feasibility of this process.

It has now been found that the compounds of Formula I may be prepared not only in excellent yields, but in a form which exhibits high brightening power and where the resultant product is substantially colorless.

It is therefore an object of the present invention to provide a new and improved process for the preparation of 4,4'-bis-(4-amino - 6 - arylamino-s-triazin-2-ylamino)-2,2'-stilbenedisulfonic acid compounds.

It is another object of this invention to provide a process for producing 4,4'-bis-(4-amino-6-arylamino-s-triazin-2-ylamino)-2,2'-stilbenedisulfonic acid compounds, not only in high yields but in a form wherein such compounds exhibit outstanding brightening power.

It is still another object of this invention to provide a new, useful and improved process for the production of 4,4'-bis-(4-amino - 6 - arylamino-s-triazin-2-ylamino)-2,2'-stilbenedisulfonic acid compounds in a substantially colorless form.

Other objects will appear hereinafter as the description proceeds.

Notwithstanding the fact that in the first condensation reaction involving the replacement of the first two chlorine atoms (one on each of the triazin rings), it has been customary to use appropriately stoichiometric amounts of arylamine, substantially to avoid reaction with the second two chlorine atoms, it has now been found that if the reaction is carried out employing, in the first step, a large excess of ammonia, that only two chlorine atoms will be replaced by amino groups and that by the use of a large excess, the equilibrium of this reaction can be made to shift almost completely towards the formation of the diamino product with no danger of the second set of chlorine atoms reacting at this time. The second condensation reaction is then carried out using a stoichiometric amount of the arylamine or a slight excess thereof, and the result is an excellent yield of the desired product in the form described above, namely, excellent brightening power and substantial absence of any yellow hue. The initial formation of the tetrachlorotriazin condensation is carried out in the conventional way using a suitable solvent for the cyanuric chloride such as acetone, ethoxyethanol, butoxyethanol, diethylene glycol dimethyl ether, and the like. This reaction is conventionally done at low temperatures, usually from about −10° C. to about +15° C. The initial amination phase of the condensation reaction is then carried out using concentrated ammonium hydroxide or its equivalent in an amount ranging from about 5 to about 20 moles thereof per mole of tetrachlorotriazin compound. The temperature for carrying out this condensation may vary from about 0° C. to about 70° C. with a range of from about 25 to 45° C. being preferred. The upper limit of the molar concentration of ammonia is not critical since above the indicated upper limit neither improvement in yield is forthcoming, nor a better product obtainable. The second condensation reaction with the arylamine is then carried out using approximately 2 moles thereof, and preferably a very slight excess up to about 10% excess. The temperature in this phase of the reaction may range from about 35° C. up to reflux of the mixture. The desired product is then isolated by precipitation, filtration and drying.

The following examples will serve to illustrate the present invention without being deemed limitative thereof. Parts are by weight unless otherwise indicated.

Example 1

A solution of 15 g. of cyanuric chloride dissolved in 65 cc. of acetone and at a temperature of 30° C. is poured into a mixture of 20 cc. of water and 100 g. of ice. To this mixture there is then added, with stirring, at a temperature of about 0° C., 118 cc. of a 12.4% by volume aqueous solution of 4,4'-diamino-2,2'-stilbenedisulfonic acid (0.04 moles). Stirring is continued for about 1 hr. to a negative amine test, and the solution is then made neutral to delta paper with 25 cc. of a 20% aqueous soda ash solution. There is then added 50 cc. of concentrated ammonia solution (0.75 moles active) and the solution is allowed to come to room temperature followed by stirring over night. Thereafter the temperature is raised to 45° C. and 8.35 g. of aniline (0.09 moles) is added. The reaction mixture is warmed to and held at 65° C. for 2 hrs. and then placed under reflux over night after having been made alkaline to phenolphthalein using 30 cc. of a 20% aqueous solution of sodium hydroxide. The acetone is then distilled off and the reaction mixture is clarified by treatment with activated carbon (Nuchar), salted with 10% aqueous sodium chloride solution, cooled to 5° C., filtered and dried. The yield is 32.9 g. of an almost white product. This product dyes cotton cloth at a 0.1% strength to give an excellent brightening effect.

In the following Examples 2 through 7, Example 1 is repeated replacing the aniline of that example with the indicated amounts of the following amines.

| Example | Arylamine | Amount (g.) |
| --- | --- | --- |
| 2 | p-Toluidine | 9.63 |
| 3 | o-Anisidine | 11.07 |
| 4 | p-Chloroaniline | 11.48 |
| 5 | Sulfanilic acid | 15.57 |
| 6 | Sulfanilamide | 15.48 |
| 7 | Dimethylsulfanilamide | 18.00 |

In each instance the products obtained are either very pale in color, or practically white, and they all exhibit excellent brightening power when dyed on cotton at 0.1% strength.

Example 8

0.2 g. of the brightener of Example 1 is dissolved in 100 cc. of water. 30 g. of bleached sulfite paper pulp (10% dry solids) is weighed into a 1 liter stainless steel cup and then 100 cc. of cold water (29° C.) is added. The slurry is stirred with a stainless steel paddle. 10 cc. of the brightener solution is added. The stirring is continued for 1 minute, whereupon 5 cc. of rosin size solution is added (made by diluting 17 parts of 70% solids commercial rosin size to 1 liter with water). It is stirred 1 minute and then 5 cc. of 1.5% alum solution is added. Stirring is continued for 20 minutes. The pulp is filtered between filter papers and felts, and dried on a steam heated drum drier between sheets of clean filter paper. The dried paper has a distinct brightness which is not evident in a similar paper made without brightener.

Other variations in and modifications of the described processes which will be obvious to those skilled in the art can be made in this invention without departing from the scope or spirit thereof.

We claim:
1. A method for preparing a compound which in the free acid form has the following formula:

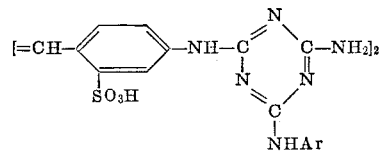

wherein Ar represents a monocyclic carbocyclic aryl radical, which comprises reacting 1 mole of a compound which in the free acid form has the formula:

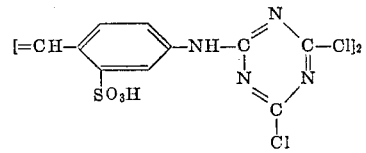

with from about 5 to about 20 moles of ammonia at a temperature of from about 0° C. to about 70° C. and then with a monocyclic carbocyclic aromatic arylamine in at least about stoichiometric quantities, up to about 10% excess, at a temperature above about 35° C.

2. A method for preparing a compound which in the free acid form has the following formula:

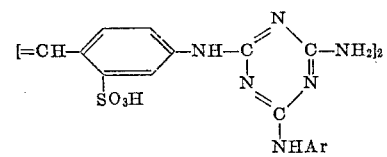

wherein Ar represents a monocyclic carbocyclic aryl radical, which comprises reacting 1 mole of a compound which in the free acid form has the formula:

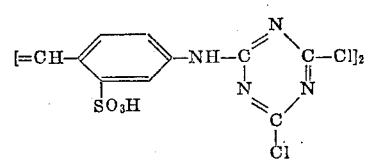

with from about 5 to about 20 moles of ammonia at a temperature of from about 25° C. to about 45° C. and then with a monocyclic carbocyclic aromatic arylamine in at least about stoichiometric quantities, up to about 10% excess, at a temperature above about 35° C.

3. A method as defined in claim 1 wherein Ar is phenyl.

4. A method as defined in claim 1 wherein Ar is alkyl phenyl.

5. A method as defined in claim 1 wherein Ar is alkoxy phenyl.

6. A method as defined in claim 1 wherein Ar is halo phenyl.

7. A method as defined in claim 1 wherein the ammonia is reacted at about room temperature and the arylamine is reacted at about 65° C.

(References on following page)

References Cited

UNITED STATES PATENTS 2,671,784 3/1954 Hein _____ 260—240 X
2,763,650 9/1956 Ackermann _____ 260—240

FOREIGN PATENTS 204,043 11/1956 Australia.

OTHER REFERENCES

Chemical Abstracts, vol. 53, col. 7599 (1959) (abstract of Yabe et al.).

Smolin et al., "s-Triazines and Derivatives," pp. 118, 279–281 and 315. Interscience Publishers, Inc., New York (1959).

JOHN D. RANDOLPH, *Primary Examiner.*